United States Patent [19]

Chonan

[11] Patent Number: 4,887,828
[45] Date of Patent: Dec. 19, 1989

[54] FIXING STRUCTURE OF FORK STEM AND FORK SHOULDER

[75] Inventor: Yoshiya Chonan, Souka, Japan
[73] Assignee: Sakae Ringyo Co., Ltd., Tokyo, Japan
[21] Appl. No.: 201,785
[22] Filed: Jun. 3, 1988
[30] Foreign Application Priority Data
  Feb. 22, 1988 [JP] Japan .................................. 63-22115
[51] Int. Cl.$^4$ ............................................. B62K 19/32
[52] U.S. Cl. .................................. 280/280; 280/279; 403/359
[58] Field of Search ...................... 280/279, 280, 281; 29/522.1, 523; 403/282, 359, 273

[56] References Cited

U.S. PATENT DOCUMENTS 2,960,342  11/1960  Raper .................................... 403/359
4,728,216  3/1988  Disborg ............................... 403/359

FOREIGN PATENT DOCUMENTS 883578  7/1943  France ................................. 280/280

Primary Examiner—David M. Mitchell
Assistant Examiner—Donn McGrehan
Attorney, Agent, or Firm—Lowe, Price, LeBlanc, Becker & Shur

[57] ABSTRACT

A fork stem is formed of material having large hardness while a fork shoulder is formed of material having hardness smaller than that of the fork stem. A plurality of projection lines are formed in an end of the fork stem. The end is forcedly inserted into a through hole of the fork shoulder and an expansion portion is formed in the end forcedly inserted into the through hole to prevent the fork stem from getting out from the through hole.

5 Claims, 3 Drawing Sheets

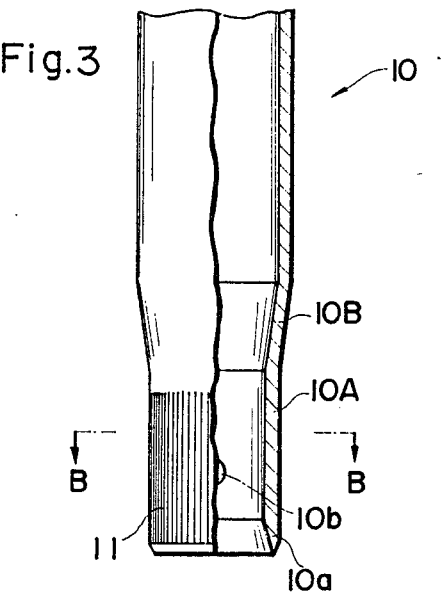
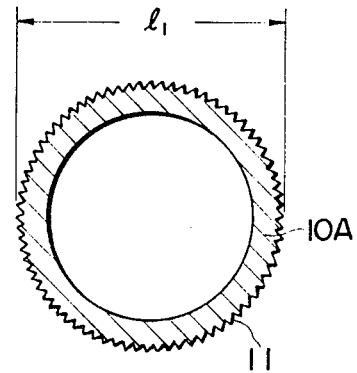
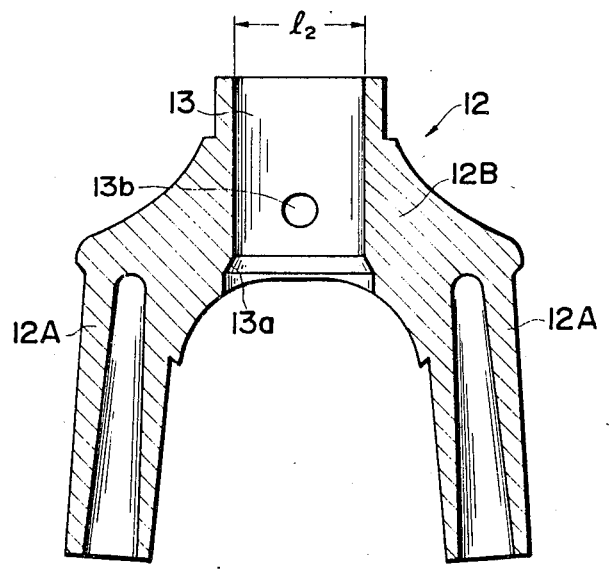

1

FIXING STRUCTURE OF FORK STEM AND FORK SHOULDER

FIELD OF THE INVENTION

The present invention relates to a fixing structure of a fork stem and a fork shoulder, and more particularly to a fixing structure of a fork stem formed of hard material and a fork shoulder formed of material a hardness less than that of the fork stem.

BACKGROUND OF THE INVENTION

Referring to FIG. 6, there is shown a fixing structure of this kind in section. A fork stem 1 is coupled at its upper end with a handlebar stem in a head pipe (not shown). A lower end of the fork stem 1 is inserted into a fork shoulder 2 and is brazed thereto with hard solder 3. Each upper end of a pair of fork legs 4 is inserted into the fork shoulder 2 and is brazed thereto with hard solder 3'.

In the fixing structure of in FIG. 6, brass is generally used as the hard solder 3(3') while the brazing with the hard solder 3 cannot join different metal materials. Accordingly, since the fork stem 1 formed of, for example, chromium molybdenum steel and the fork shoulder 2 formed of, for example, an alloy of aluminum can not be brazed with hard solder 3, other joining means must be adopted. Further, the brazing with hard solder 3 requires skill and time and since the fork shoulder 2 is heated to a high temperature of about 900° C. and is softened, the mechanical strength thereof is deteriorated.

Recently, various methods of joining the fork stem and the fork shoulder formed of different metal materials have been proposed. For example, Japanese Utility Model Unexamined Publication No. 62-115288 discloses a structure of joining a fork stem and a fork shoulder formed of different metal materials in which a lower end of the fork stem is inserted into a sleeve to join the fork stem and the sleeve with adhesive and the sleeve is then fitted into the fork shoulder to be welded together. However, since this structure requires the sleeve and thread grooves formed on the lower portion of the fork stem and the sleeve, it requires high material and work cost and is therefore expensive.

Further, Japanese Utility Model Unexamined Publication No. 62-189295 also discloses a structure in which a lower portion of a fork stem is directly screwed into a hole formed in a fork shoulder and both of them are joined with adhesive. This structure can reduce the number of parts, through it requires work for forming thread grooves and high labor cost.

In addition, Japanese Utility Model Unexamined Publication No. 58-111687 discloses a structure in which a cylindrical portion is integrally provided in a fork shoulder and a tapered portion in a lower portion of a fork stem is fitted into a tapered hole formed in the cylindrical portion so that both the fork shoulder and fork stem are fixed with adhesive. This is advantageous in that the number of parts is small, labor for forming a thread groove and effecting welding are not required and furthermore assembling work is easy. However, since only the adhesive is used, the joining strength is deteriorated.

SUMMARY OF THE INVENTION

Accordingly, it is an object of the present invention to provide a fixing structure of a fork stem and a fork shoulder in which the fork stem and the fork shoulder are joined to each other inexpensively with good work efficiency while maintaining mechanical strength and joining strength.

According to the present invention, a plurality of projection lines are formed in the outer periphery of an end of a fork stem in the axial direction of the fork stem and a fork shoulder formed of material having hardness smaller than that of the fork stem is formed with a through hole into which the end of the fork stem is forcedly inserted. After the end of the fork stem is forcedly inserted into the through hole, the tip of the end of the fork stem is expanded to prevent the fork stem from being removed from the through hole. Accordingly, the fork stem and the fork shoulder formed of different metal material can be joined together with good work efficiency while maintaining mechanical strength and joining strength. Only the projection lines are formed in the end of the fork stem and hence working cost and material cost are extremely cheap.

BRIEF DESCRIPTION OF THE DRAWINGS

FIG. 3 is a partially broken sectional view of a fork stem according to the present invention;

FIG. 4 is a sectional view of the fork stem taken along ling B—B in FIG. 3;

FIG. 5 is a sectional view of a fork shoulder according to the present invention.

DETAILED DESCRIPTION OF THE PREFERRED EMBODIMENT

Figure 1:
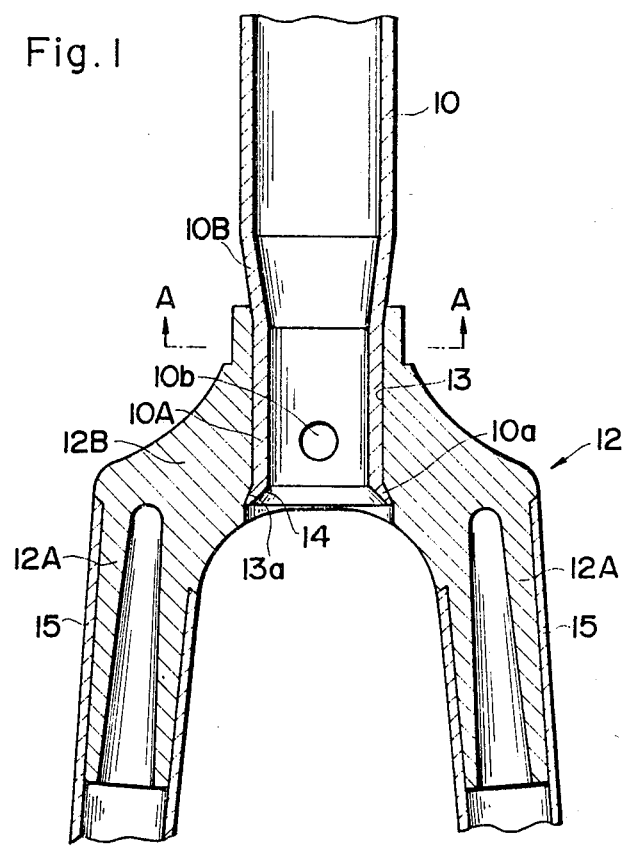
FIG. 1 is a sectional view of a fixing structure according to an embodiment of the present invention.

Referring to FIGS. 3 and 4, a fork stem 10 formed of chromium molybdenum steel having large hardness includes an end 10A having a slightly small diameter. A plurality of projection lines 11 are formed in the outer periphery of the end 10A of the fork stem 10. These projection lines 11 extend in the axial direction of the fork stem 10 and are formed by cutting grooves in the stem in the longitudinal direction thereof by knurling. A tip 10a of the end 10A of the stem is formed into the trumpet-shape with a taper so that the thickness of the peripheral wall of the tip is gradually reduced to increase the diameter of the tip gradually. The end 10A of the stem is formed with a hole 10b which penetrates the end 10A in the radial direction thereof and to which a brake device is mounted.

Referring to FIG. 5, there is shown in section a fork shoulder 12 according to the present invention. The fork shoulder 12 is formed of an alloy of aluminum and includes arms 12A extending from both shoulders thereof. A through hole 13 is formed in the central body 12B of the fork shoulder 12. The through hole 13 is formed with an inner diameter of $l_2$ and the end 10A of the fork stem 10 is formed with an outer diameter of $l_1$ which is larger than the inner diameter of $l_2$ of the through hole 13. For example, the outer diameter $l_1$ is 22.2 mm while the inner diameter $l_2$ is set to a slightly small value of 21.8 mm. A taper portion 13a having an inner diameter which is gradually expanded is formed in the lower end of the through hole 13 of the fork shoulder 12. Further, a hole 13b to which a brake device is mounted is formed in the body 12B of the fork shoulder in which the through hole 13 is formed.

Figure 2:
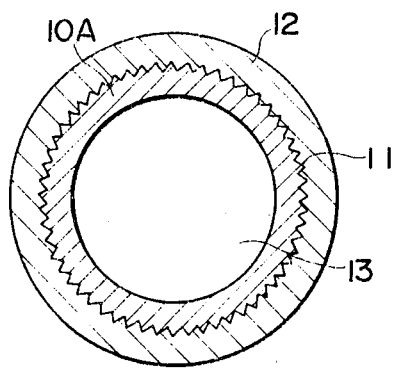
FIG. 2 is a sectional view of the structure of FIG. 1 taken along ling A—A in FIG. 1.
Figure 6:
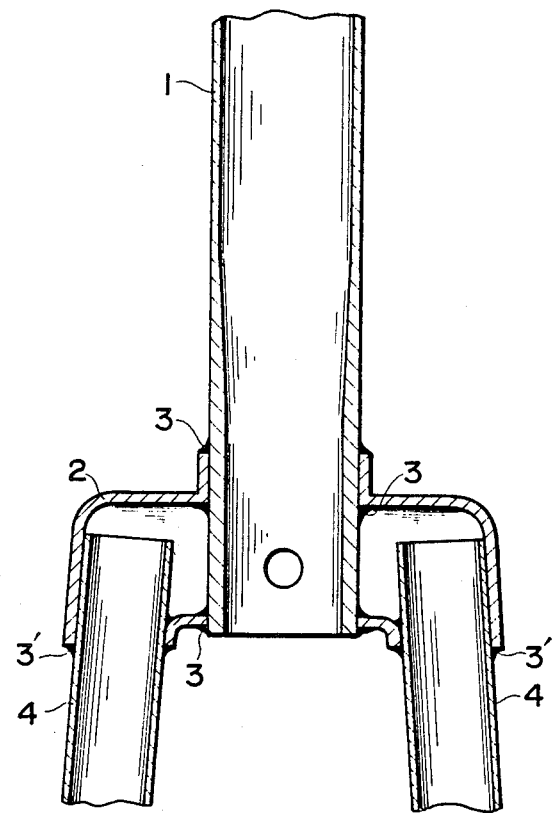
FIG. 6 is a sectional view of a conventional fixing structure.

FIG. 1 is a sectional view of the fixing structure according to the present invention and FIG. 2 is a sectional view taken along ling A—A in FIG. 1. In FIGS. 1 and 2, the end 10A of the fork stem 10 is forcedly inserted into the through hole 13 of the fork shoulder 12. In this case, since the fork stem 10 is formed of chromium molybdenum steel having large hardness whereas the fork shoulder 12 is formed of the alloy of aluminum having a smaller hardness and the outer diameter $l_1$ of the end 10A is larger than the inner diameter $l_2$ of the through hole 13, the through hole 13 is deformed when the end 10A is forcedly inserted into the through hole 13. More particularly, as shown in FIG. 2, the inner wall of the through hole 13 is deformed in accordance with the projection lines 11 of the end 10A so that the outer periphery of the end 10A is closely fixed to the body 12B of the fork shoulder 12 by means of the projection lines 11. Accordingly, the fork stem 10 cannot rotate with respect to the fork shoulder 12.

The tip 10a of the end 10A is expanded by e.g. swaging to increase the diameter thereof to form an expansion portion 14. The expansion portion 14 engages the taper portion 13a formed in the fork shoulder 12. Accordingly, the expansion portion 14 prevents the fork stem 10 from lifting out of the fork shoulder 12. On the other hand, the fork stem 10 includes a taper portion 10B formed adjacent to the end 10A. Accordingly, when the end 10A is forcedly inserted into the through hole 13, the upper end of the through hole 13 is slightly expanded by the taper portion 10B. The taper portion 10B serves to prevent the end 10A from moving out from the through hole 13 in the downward direction.

Further, as shown in FIG. 1, the upper end of fork legs 15 are fitted into the arms 12A of the fork shoulder and fixed thereto.

As described above, the end 10A having the projection lines 11 is forcedly inserted into the through hole 13 and the expansion portion 14 is engaged with the taper portion 13a of the fork shoulder 12 so that the fork stem 10 and the fork shoulder 12 can be fixedly joined to each other simply in a short time by the forced insertion and swaging even if the fork stem 10 and the fork shoulder 12 are formed of different metal. Further, since the inner periphery of the through hole 13 of the fork shoulder 12 is deformed by the projection lines 11 formed on the outer periphery of the end 10A by inserting the end 10A into the through hole 13 so that the end 10A is closely joined to the through hole 13 of the fork shoulder 12, the strength of joining the fork stem 10 to the fork shoulder 12 is improved. In addition, since any brazing work or welding work is not required and only the simple cutting work for forming the projecting lines 11 is required as described above, the working cost is reduced while maintaining the mechanical strength.

In the embodiment, the projection lines 11 may be dispersedly formed on the outer periphery of the end 10A and the number of the projection lines and the projection amount thereof may be set to prevent rotation of the fork stem 10.

I claim:

1. Apparatus comprising a fork stem and a fork shoulder, an insertion end of said fork stem being formed of a material having a first hardness, a plurality of projection ridges of said first hardness formed in an outer periphery of said end and in an axial direction of said fork stem, a through hole formed in said fork shoulder formed of material having a second hardness less than the first hardness and into which said end is forcedly inserted, an outer diameter of said insertion end defined by said ridges being greater than the inner diameter of the through hole to thereby enable deformation of the through hole walls upon insertion.

2. Apparatus of claim 1, further including an expansion portion formed in a tip of said insertion end forcedly inserted into said through hole, said expansion portion being deformed radially outwardly to prevent said fork stem from lifting out of said through hole.

3. Apparatus of claim 1, wherein the first hardness of the projection ridges and the hardness of portions extending between the ridges are the same.

4. Apparatus of claim 1, wherein a portion of the fork stem located immediately above the insertion end is tapered to contact and expand, by deformation, the upper end of the through hole to prevent downward movement of the stem insertion end through and out of the through hole.

5. Apparatus of claim 1, wherein said ridges extend as continuous linear axial lines along the outer surface of the fork stem insertion end.

* * * * *